United States Patent
Skinner

[15] 3,665,951
[45] May 30, 1972

[54] SPILL VALVES

[72] Inventor: Robert Thomas John Skinner, Kenilworth, England

[73] Assignee: Joseph Lucas (Industries) Limited, Birmingham, England

[22] Filed: Dec. 11, 1970

[21] Appl. No.: 97,224

[52] U.S. Cl.............................137/117, 137/487, 137/489.3
[51] Int. Cl. ........................................................G05d 16/18
[58] Field of Search..................137/117, 485, 487, 488, 489, 137/490, 491, 489.3, 489.5

[56] References Cited

UNITED STATES PATENTS 3,572,365  3/1971  White....................................137/117
3,349,714  10/1967  Grenier..................................137/117
2,916,041  12/1959  Van Meter..............................137/117

Primary Examiner—Samuel B. Rothberg
Assistant Examiner—William H. Wright
Attorney—Holman & Stern

[57] ABSTRACT

A spill valve for a fuel control system has a pilot valve responsive to the pressure difference across a fuel control unit and a follow-up servo valve assembly controlled by the pilot valve to spill fuel from the upstream side of the control unit. There is relative rotation between the pilot valve and the servo valve assemble to reduce the effects of static friction.

8 Claims, 1 Drawing Figure

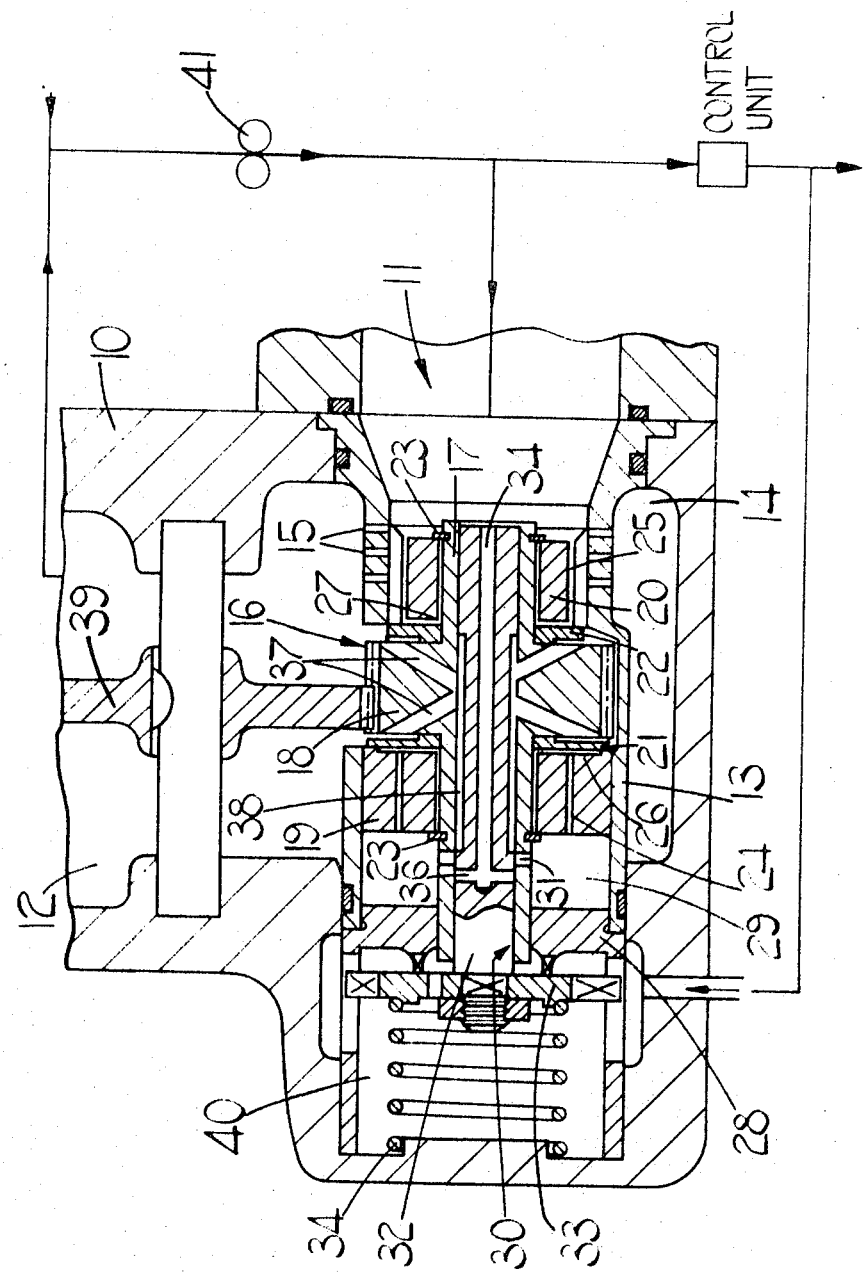

SPILL VALVES

This invention relates to a spill valve arrangement and in particular to such a valve arrangement for use in a fuel control system.

A valve arrangement to control the spill of fluid to a return line comprises a body having an inlet to which fluid at a first pressure is, in use, supplied, an outlet for connection to the return line and a port between the said inlet and outlet, a servo valve assembly slidable in the body and incorporating a closure member for the said port, means for rotating the servo assembly with respect to the body, a chamber defined between the body and the servo assembly a valve spool slidable within the servo valve assembly and, in use, subjected at opposite ends to the pressure at the inlet and to a pressure which is intermediate the first pressure and the pressure in the return line, means for preventing rotation of the valve spool with respect to the body and a biasing means for the valve spool against the said first pressure, the said valve spool incorporating a pair of passages by means of which either the said inlet or outlet may communicate with the said chamber, the valve spool and the servo valve assembly co-operating, in use, to form a pilot valve arrangement, the whole arrangement being such that variation of the difference between the first and intermediate pressures results in a movement of the valve spool whereby the pilot valve arrangement causes a variation of the pressure in said chamber in a manner to cause the servo valve assembly to follow the valve spool to restore an equilibrium condition.

An embodiment of the invention will now be described by way of example and with reference to the accompanying drawing which shows a section through a spill valve arrangement.

A body 10 is formed with an inlet 11 and an outlet 12. The body 10 includes a bush 13 which defines within the body 10 an annular passage 14 communicating with the outlet 12. A plurality of ports 15 extend between the inlet 11 and the outlet 12. A valve assembly 16 is rotatable and slidable within the bush 13. The element 16 comprises a sleeve 17 having a spur gear 18 formed integral therewith and a pair of bearing elements 19, 20 and spacers 21, 22 which are retained on the sleeve 17 by means of circlips 23. The elements 19, 20 are running fits in the bush 13 and on the sleeve 17. Elements 19, 20 have respective through passages 24, 25 and are formed, adjacent the respective spacers 21, 22, with annular recesses 26, 27. As shown, bearing element 20 forms a closure member for the ports 15.

The body 10 includes a member 28 in which the sleeve 17 is slidable. The member 28 defines between the assembly 16 and the body 10 a chamber 29, and also defines a further chamber 40 within the body 10. The chamber 29 communicates with an axial bore 30 in the valve assembly 16 via ports 31. The bore 30 also communicates with passages 37 in the gear portion 18. Spacers 21, 22 are formed, adjacent the gear portion 18 with annular recesses by means of which the passages 37 communicate with annular passage 14 and outlet 12. Projections on elements 19, 20 defined by recesses 26, 27 respectively, sealingly engage associated spacers 21, 22. Similar projections on spacers 21, 22 sealing engage adjacent faces of gear portion 18. A valve spool 32 is slidable in the bore 30 and includes a plate 33 non-rotatably mounted thereon at an end of the spool 32 remote from the inlet 11. The plate 33 has projections which engage recesses in the body to prevent rotation of the spool 32. A spring 34 engages the plate 33 to bias the spool 32 towards the inlet 11. The spool 32 has an axial bore 35 and a communicating transverse bore 36. The spool 32 also has an annular recess 38 which communicates with the passages 37 in the valve assembly 16. A spur gear 39 mounted in the body 10 engages the spur gear 18 of the assembly 16.

A positive displacement pump 41 has its output connected to the inlet 11 and also to an external control unit (not shown). The outlet 12 is connected to a return line for the pump and the chamber 40 to a pressure downstream of the external control unit.

In use, the pump 41 delivers fuel at a substantially constant rate to the control unit. For a given pressure drop axross the control unit the valve spool 32 and the valve element 36 adopt a position, in a manner later to be described at which the flow through the ports 15 maintains the said pressure drop.

The pressure at the inlet 11 acts on both faces of the bearing element 20, but the difference in areas subjected to this pressure causes the element 20 and spacer 22 to be urged towards the spur gear portion 18 of the valve assembly 16. The bearing element 19 and spacer 21 are similarly urged towards the portion 18 by the pressure in chamber 29. The sleeve 17, elements 19, 20 and spacers 21, 22 thus move as a unit, the advantage of the configuration being that eccentricities of the several parts of the valve assembly 16 or the body 10 are thereby accommodated.

If the pressure at the inlet 11 rises or the pressure downstream of the control unit falls, the spool 32 will move against the bias of the spring 34 to permit the chamber 29 to communicate with the outlet 12 via ports 31, recess 38 and passages 37. The valve assembly 16 will thus, under the influence of the pressure in the inlet 11 move to follow the spool 32 thereby opening more of the ports 15. The resultant falling pressure at the inlet 11 moves the spool 32 towards the inlet until the spool 32 and valve assembly 16 are aligned, when chamber 29 is again isolated and equilibrium is restored. The spool 32 thus co-operates with the sleeve 17 to form a pilot valve arrangement, and the valve assembly 16 as a whole acts as a servo follower.

A reduction in the inlet pressure or an increase in the pressure in chamber 40 causes the spool 32 to move so that the chamber 29 is subjected, via the ports 31 and bores 35, 36, to the inlet pressure. The difference in the areas of the valve assembly 16 subjected respecively to the pressures in chamber 29 and inlet 11 causes the valve assembly 16 to move to close the ports 15, thereby raising the inlet pressure and restoring an equilibrium condition. The pressure difference at which an equilibrium condition will obtain is governed by the force exerted by the spring 34.

The valve element 16 is rotated by an external drive applied to the spur gear 39, so as to reduce static friction between the assembly 16 and the body 10 and spool 32 respectively.

Having thus described my invention what I claim as new and desire to secure by Letter Patent is:

1. A valve arrangement to control the spill of fluid to a return line comprises a body having an inlet to which fluid at a first pressure is, in use, supplied, an outlet for connection to the return line and a port between the said inlet and outlet, a servo valve assembly slidable in the body and incorporating a closure member for the said port, means for rotating the servo assembly with respect to the body, a chamber defined between the body and the servo assembly a valve spool slidable within the servo valve assembly and, in use, subjected at opposite ends to the pressure at the inlet and to a pressure which is intermediate the first pressure and the pressure in the return line, means for preventing rotation of the valve spool with respect to the body and a biasing means for the valve spool against the said first pressure, the said valve spool incorporating a pair of passages by means of which either the said inlet or outlet may communicate with the said chamber, the valve spool and the servo valve assembly co-operating, in use, to form a pilot valve arrangement, the whole arrangement being such that variation of the difference between the first and intermediate pressures results in a movement of the valve spool whereby the pilot valve arrangement causes a variation of the pressure in said chamber in a manner to cause the servo valve assembly to follow the valve spool to restore an equilibrium condition.

2. A valve arrangement as claimed in claim 1 in which the servo valve assembly includes passages by means of which one of the passages in the valve spool communicates with the outlet.

3. A valve arrangement as claimed in claim 1 in which the servo valve assembly includes a toothed gear element and there is provided a further toothed gear element rotatably mounted in the body and meshing with the servo valve assembly.

4. A valve arrangement as claimed in claim 3 in which the servo valve assembly includes a pair of bearing elements respectively biased towards opposite sides of the servo valve gear element by the pressures in the said inlet and said chamber.

5. A valve arrangement as claimed in claim 4 which includes a spacer between each bearing element and the associated side of the servo valve gear element, each said spacer having a channel through which the passages in the valve spool communicate with the outlet, and each said spacer sealingly engaging both its associated bearing element and the associated side of the servo valve gear element.

6. A valve arrangement as claimed in claim 4, in which each bearing element has an axial through pass-age and is formed at its end adjacent the servo valve gear element with a recess whose cross sectional area is less than the area of the other end of the bearing element.

7. A valve arrangement as claimed in claim 4, in which one of the bearing elements forms the closure member of said port between the inlet and outlet.

8. A valve arrangement as claimed in claim 1 which includes a further chamber within the body to which the intermediate pressure is, in use, admitted and the means for preventing rotation of the valve spool comprises one or more projections on the spool engageable in recesses in the wall of said further chamber.

* * * * *